H. BURGESS.
Apparatus for Making Tubes of Plastic Material.
No. 208,792. Patented Oct. 8, 1878.
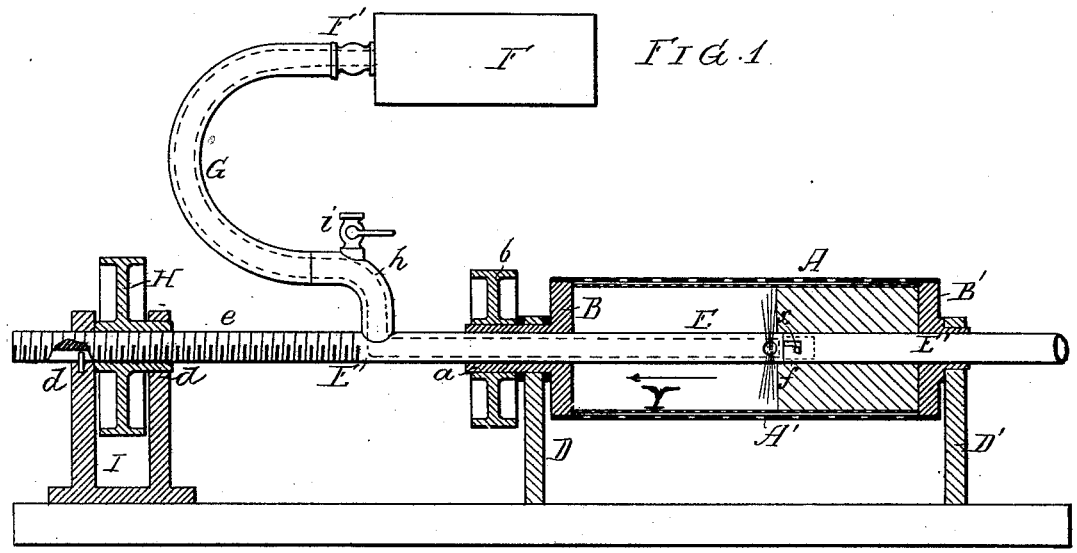
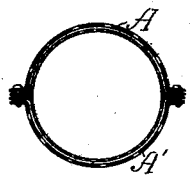
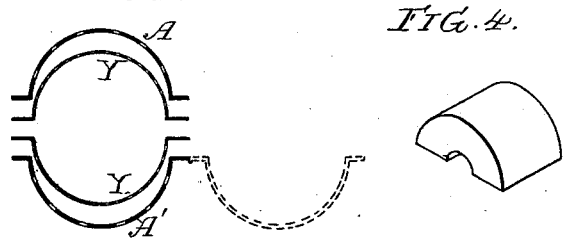
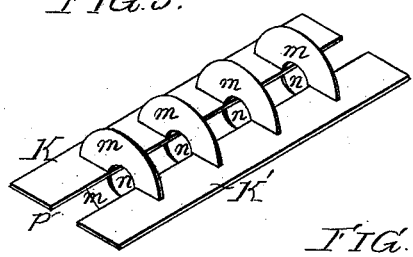
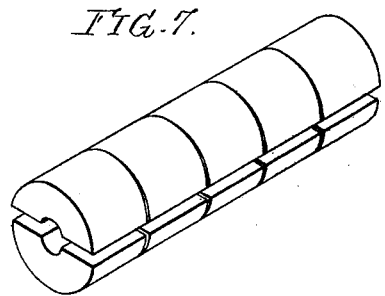
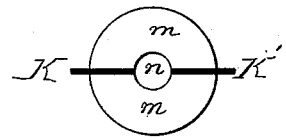
Witnesses.
Henry Howson jr.
Harry A. Crawford
Inventor.
Hugh Burgess
by his attorneys
Howson and Son

UNITED STATES PATENT OFFICE.

HUGH BURGESS, OF ROYER'S FORD, PENNSYLVANIA.

IMPROVEMENT IN APPARATUS FOR MAKING TUBES OF PLASTIC MATERIAL.

Specification forming part of Letters Patent No. 208,792, dated October 8, 1878; application filed August 15, 1878.

*To all whom it may concern:*

Be it known that I, HUGH BURGESS, of Royer's Ford, Montgomery county, Pennsylvania, have invented a new and useful Improvement in Machines for Making Tubes and Segments of Paper-Pulp and other materials, of which the following is a specification:

The object of my invention is the rapid and economical manufacture of tubes or segments of paper-pulp or other material, which can be held in suspension in water and compacted by centrifugal force in a screen, and this object I attain in the following manner, reference being had to the accompanying drawing, in which—

Figure 1 is a vertical section of the apparatus; Figs. 2 and 3, transverse sections of the screen; Fig. 4, a perspective view of one of the products of the apparatus; Fig. 5, a perspective view of a device to be applied to the screen when the blocks, Fig. 4, have to be made; Fig. 6, a transverse section of Fig. 5; and Fig. 7, a perspective view of the contents of the screen after the apparatus has been used with the device, Fig. 5.

A A' is a cylindrical screen, made in two semi-cylindrical parts, one of which may be secured permanently to the opposite end disks, B B', the other being detachable therefrom. This screen should be made of substantial wire-gauze with large meshes, or it may be made of perforated plates, so as to form a substantial backing for an inner screen, Y, which is also made in two parts, but of fine wire-gauze.

It is immaterial what appliances are used for connecting these two parts together, providing one part of the outer screen is removable, as shown in Fig. 3, so as to permit the withdrawal of one or both parts of the inner screen, Y. One part of the outer screen may, for instance, be hinged at one edge to the other part, as shown by dotted lines in Fig. 3, the opposite edges of the two parts being connected together by clamps, bolts, turn-buckles, or other devices.

The disk B is provided with a tubular journal, a, adapted to a bearing on the support or frame D, and the other disk, B', has a similar tubular journal, adapted to a bearing on the support D', the journal a being furnished with a pulley, b.

A pipe, E, closed at the point f, passes through both tubular journals and through the screen; or the pipe may terminate within the screen at the point f, where a follower, E', may be secured to the said pipe, so as to be detachable therefrom, and so as to close the same; and near this closed portion of the pipe there are lateral openings x x, for a purpose explained hereinafter.

F is a reservoir, containing the material to be formed into tubes by the aid of the screen and pipe E, this material consisting of paper-pulp, or pulp and sawdust combined, and held in suspension in water.

To a cock, F', on the reservoir F is attached a flexible tube, G, which is connected to a branch, h, on the pipe E, the latter being combined with appliances by which it can be moved longitudinally in the journals of the screen without revolving therewith.

In the present instance a portion, e, of the pipe is threaded and adapted to the threaded interior of the hub of a pulley, H, which is arranged to revolve in and is confined laterally by bearings d d on a standard, I, so that on turning the pulley the pipe E will be moved longitudinally, any suitable device being employed for preventing it from being turned.

The pipe E is first so adjusted in the screen that its orifices x shall be near the disk B', after which the follower E' is passed through the journal a of the screen and attached to the end of the pipe E by the bayonet-joint f, or other device, and the screen is caused to revolve at great speed, and the pipe E is moved slowly in the direction of the arrow, while the water, with pulp in suspension, is permitted to flow into the tube E, and thence through the lateral perforations or openings x into the screen.

The pulp, deprived of its water by centrifugal force, will be packed first against the disk B' within the screen, and as the pipe E moves in the direction of the arrow more and more pulp will be added, until by the time the perforations in the pipe E have passed into the disk B the entire annular space between the follower and screen will be tightly packed with pulp in a comparatively dry condition, the rear portion of the pipe or its follower having during this operation served as a core to determine the bore of the paper tube.

The movement of the screen should now be arrested, the follower detached from the pipe E and withdrawn from the screen, or as far as the disk B, when the screen may be opened and the tube of pulp removed.

While the apparatus may thus be used for forming tubes of different materials and compositions, it has been devised mainly for the formation of semi-cylindrical sections or segments, (shown in Fig. 4,) for covering steam and other pipes to prevent loss of heat by radiation. When the apparatus has to be used for this purpose, I combine with the screen the device shown in Fig. 5, which consists of two thin metal plates, K K', as long as the distance between the disks B B'. These two plates are connected together above and below by semi-annular partitions m m, of the same diameter as the interior of the screen, the width across the two plates being greater than the diameter of the screen, so that they may be confined between the edges of the same. (See the transverse section, Fig. 6.)

The openings n in the partitions and the space p between the plates must be such as not to interfere with the pipe E, although the latter should be as near as possible to both. When the frame thus composed of the plates K K' and semi-annular partitions has been placed within the screen and the pipe E has been introduced, the interior of the said screen will be separated into semi-annular compartments; and if the apparatus be operated in the manner described above, each of these compartments will be packed with the pulp or other material, and the result will be a series of semi-annular blocks or segments, as shown in Fig. 7, which, after they are removed from the screen and dried, may be applied as coverings for pipes.

It will be seen that the branch h of the pipe E has a cock, i, which must communicate with a supply of water under pressure, the cock to be opened, so as to clear the branch of any accumulation of pulp which may tend to choke the same after the use of the machine has been discontinued.

I claim as my invention—

1. The combination of a two-part screen and appliances for rapidly rotating the same with a central pipe, E, communicating with a supply of the material to be treated, and having lateral openings x x within the screen, and with mechanism for moving the pipe longitudinally within the screen as the latter revolves, all substantially as set forth.

2. The combination, with the screen, of the pipe E and its detachable follower E', as described.

3. The combination of the screen, the pipe E, reservoir F, and the elastic tube G, forming a communication between the said reservoir and pipe, as specified.

4. The combination of the reservoir F, pipe E, elastic connecting-tube G, and cock i, communicating with a supply of water under pressure.

5. The combination of the said screen and its pipe with plates K K' and partitions m.

In testimony whereof I have signed my name to this specification in the presence of two subscribing witnesses.

HUGH BURGESS.

Witnesses:
 HARRY A. CRAWFORD,
 HARRY SMITH.